Nov. 2, 1926.

N. J. CAVAGNARO ET AL 1,604,970

KNEADING MACHINE

Filed August 20, 1925

INVENTOR
Nicholas J. Cavagnaro.
Conrad Ambrette.
BY
Gustav Drews
ATTORNEY

Patented Nov. 2, 1926.

1,604,970

UNITED STATES PATENT OFFICE.

NICHOLAS J. CAVAGNARO, OF RICHMOND HILL, AND CONRAD AMBRETTE, OF BROOKLYN, NEW YORK, ASSIGNORS TO CEVASCO CAVAGNARO & AMBRETTE, INC., OF BROOKLYN, NEW YORK, A CORPORATION OF NEW YORK.

KNEADING MACHINE.

Application filed August 20, 1925. Serial No. 51,342.

This invention relates in general to kneading machines and more especially to improvements in machines for kneading alimentary pastes such as are used in the manufacture of macaroni, spaghetti and noodles.

Among the objects of the present invention it is aimed to provide protecting means or guarding means that can be readily attached and equipped with standard kneading machines having a rotary trough and kneading rollers operating therein.

With the standard kneading machines having an enlarged trough for receiving the dough and which rotate about a vertical axis, and in which kneading rollers are disposed to operate inside of said trough to engage the plastic material to be kneaded, the attendant is required from time to time in the course of operation to extend his hands or parts of his body into the trough of the machine. When so doing his body will frequently come in contact with the rotating trough and if he is not careful he may be caught by the trough and be drawn under the kneading rollers with consequent injury to the attendant.

To this end the present invention contemplates the provision of a guard that is stationary relative to the rotating trough so that the attendant will engage such stationary guard or apron and thus be positively prevented from leaning against the rotating trough.

To this end it is also an aim of the present invention to provide guards or aprons that can be readily and conveniently attached to the standard kneading machines of the character aforesaid positively to prevent drawing the attendant's hands or other parts of his body into engagement with the kneading rollers.

To this end, it is still a further object of the present invention to provide a combination of guards or aprons that can be readily and conveniently attached to standard kneading machines of the character aforesaid whereby the person of the attendant will be protected from engagement with the rotating trough thus to prevent him being upset or caught by the same, and whereby the kneading rollers will be covered to protect the person of the attendant from being drawn under such kneading rollers in any event, whether being upset by engagement with the rotating trough or whether otherwise brought into proximity with the kneading rollers.

It is a still further object of the present invention to provide protecting guards or aprons which will in no way interfere with the operation of a kneading machine of the character aforesaid or with the attention to the operation thereof by the attendant and which will nevertheless effectively protect the person of the attendant from engagement with the rotating trough and the kneading rollers.

It is also an object of the present invention to provide in kneading machines of the character aforesaid having a rotating trough and kneading rollers operating therein, a mechanism for positively stripping and scraping the plastic material from the kneading rollers to prevent the same being accumulated on the kneading rollers.

These and other features, capabilities and advantages of the invention will appear from the subjoined detail description of one embodiment thereof illustrated in the accompanying drawings in which—

Figure 1:
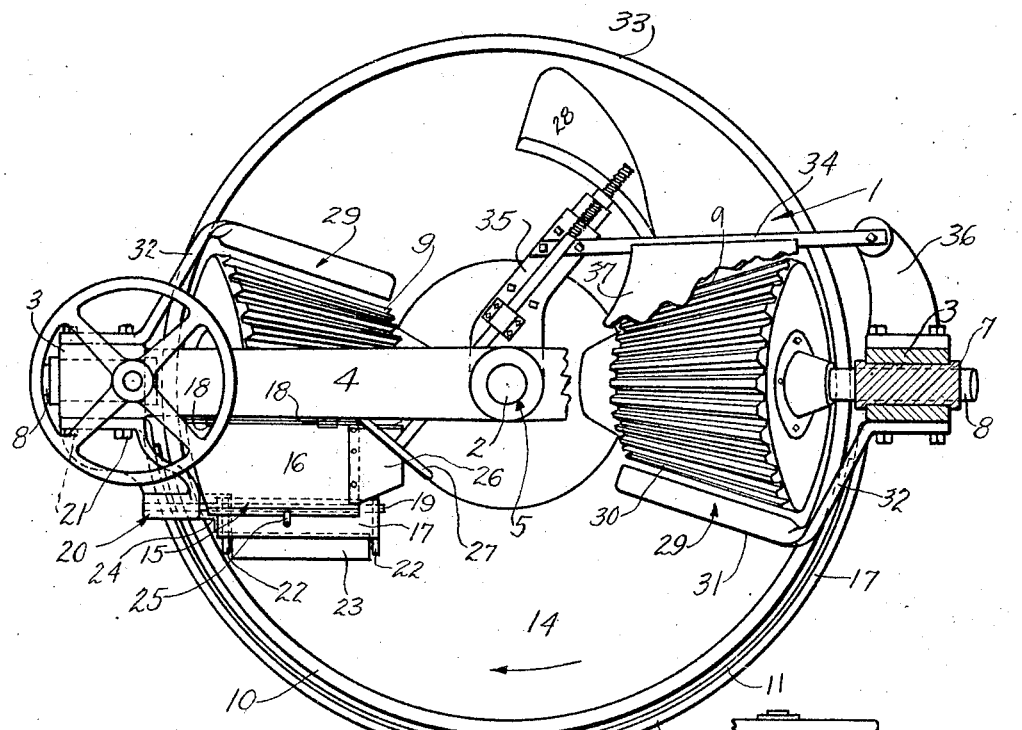
Figure 1 is a plan view partly broken away of a standard kneading machine equipped with the present improvements.

In the embodiment illustrated, there is shown a standard kneading machine having an enlarged rotatable trough 1 secured to the rotating shaft 2. The shaft 2 is rotated by suitable mechanism generally located beneath the trough 1, not illustrated since it forms no part of the present invention.

In the present instance, there are illustrated diametrically opposed to one another on either side of the trough 1, standards 3. The upper ends of these standards 3 are preferably provided with a cross bar 4 having an opening 5 to receive the shaft 2 and thus aid in alining the same. Preferably as shown, each of the standards 3 has a guideway 6 slidably to receive the journal box 7 for the shaft 8 of a fluted kneading roller 9. The shafts 8 of the kneading rollers preferably incline downwardly from the standards 3 into the trough 1 so that the conical surface of the kneading rollers may move through a plane that is parallel to the bottom of the trough 1. The slidable connection of the journal boxes 7 in the standards 3 is provided to facilitate adjusting the kneading rollers in a vertical direction.

In the operating of these kneading machines, the trough 1 alone is positively rotated and the kneading rollers 9 are rotated by engagement with the plastic material being kneaded in the trough 1.

Figures 2, 3:
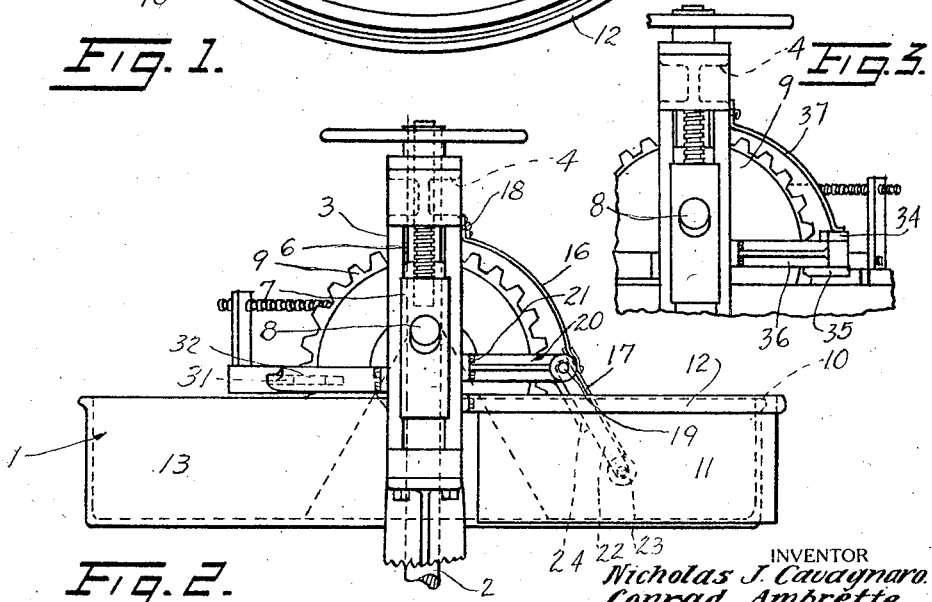
Fig. 2 is a side elevation of the same.
Fig. 3 is a fragmental side elevation of the right hand side of Fig. 1.

In the machines heretofore in use, the attendant when removing the plastic material from the trough 1 was located along the edge 10 of the trough 1 and consequently when absorbed in his work he would frequently come in contact with this moving edge 10 and be drawn toward the kneading roller 9 to his left. As a result thereof, if he lost his footing which was not unusual, on account of the slippery floors generally in the vicinity to machines where plastic material is being mixed or kneaded, his hands which would be extended into the trough 1 would not infrequently be drawn into engagement with the kneading roller 9 to his left. On account thereof, the present invention aims to provide a guard for positively preventing the body of the attendant contacting with the edge 10 of the trough 1. To this end, there is provided in the present embodiment an arcuate apron 11 which extends from one standard 3 to the other and is secured in the present instance to the half round bar 12, the ends of which extend beyond the apron 11 and are secured to the standards 3 by suitable means such as bolts as indicated in Fig. 2. The apron 11 as illustrated in Fig. 2 extends the full height of the side wall 13 of the trough 1 and is suspended from the half round bar 12, thus forming a finished upper edge to the apron 11.

To further protect the attendant from injury the present invention also contemplates guards positively to prevent the hands of the attendant being drawn under the kneading rollers 9. As a matter of fact since the trough 1 as shown in Fig. 1 rotates in a clock-wise direction as indicated by the arrow 14, and since the attendant is only required to stand adjacent to the edge 10 during the operation of the machine, only one such guarding means is required. In other words, with the rotation of the trough 1 in the direction of the arrow 14, the plastic material in the trough 1 will be fed to the kneading roller 9 to the left of the attendant and consequently a guarding means need only be provided for such kneading roller. The embodiment shown illustrates the provision of only one such guarding means which will be designated generally by the reference character 15.

This guarding means 15 in the present instance consists essentially of two depending aprons 16 and 17.

The depending apron 16 is hingedly connected at 18, 18 to the cross piece 4 to the left of the attendant and as illustrated in Fig. 2 is curved to conform to the kneading roller 9. The lower end of the depending roller 16 is intended to rest on the upper apron 16 of the depending apron 17. The upper end of the apron 17 is pivotally connected to the pin 19 supported by the casting 20 which casting in turn is suitably secured to the standard 3 at 21, 21. The apron 17 consists essentially of a piece of sheet metal and is secured to two side bars 22, 22. Between the lower ends of said side bars is pivotally connected the roller 23 extending the full width of the apron 17 and adapted to rest on, or disposed adjacent to, the plastic material being kneaded. The apron 17 is free to swing upwardly about the pin 19 and is limited in its downward movement by the stop 24 formed on the casting 20.

The apron 16 as aforesaid is free to be swung upwardly when access is sought to the kneading roller 9 under such apron 16, and this apron 16 is limited in its downward movement by the upper end of the apron 17. In order readily to anchor the apron 16 in its lowered or closed position, there is provided in the present instance a pivoted latch strip 25 pivoted on the apron 17 and adapted to swing upward and engage the lower edge of the apron 16 when swung into lowered position. The apron 16 has an extension 26 secured thereto and extending toward the shaft 5 which is preferably inclined toward the diminished end of the kneading roller 9 to afford access to the adjusting wheel 27 of the mixing member 28.

By means of the aforesaid aprons 16 and 17 it is obvious that if the attendant should slip adjacent to the kneading machine and fall in the direction of the kneading roller 9 to the left of him his hands would first strike the aprons 16 and 17 and thus he could readily engage the same and quickly right himself without any danger to himself. On the other hand, should he fall on the mixing material itself and be drawn toward the apron 17 he would merely strike the roller 23 which would force his hands into the dough without injury to himself and arrest his fall sufficiently to permit him to right himself before he would be drawn to the kneading roller 9. The provision of two aprons serves also to the end that, should the lower apron be forced upward due to contact with the lower end thereof by the hand of the operator, the upper apron would provide a support upon which the attendant could swing his elbow or his other hand quickly to right himself.

The attendant for supplying plastic material to the trough 1 is generally located at the side 33 adjacent to the mixing member 28. Adjacent to this side 33 and preferably slightly above the same there is located the dough mixer where the dough is initially mixed and from which the dough is taken and fed to the trough 1. Frequently the attendant at such side 33 when conveying the dough from the mixer to the trough 1 finds it necessary when so attending to his work, to place his foot upon the brace 34, and consequently here again if for one reason or another he should lose his footing and slip into engagement with the adjacent kneading roller 9, serious injury to his person might result. This brace 34 as shown in Fig. 1 extends from the bracket 35 of the control rod for the mixing member 28 to the casting 36 extending rearwardly from the right hand standard 3. In order to protect the attendant from injury by the right hand kneading roller 9 there is provided in the present instance a curved guard or apron 37 which is hingedly connected to the rear edge of the cross arm or cross piece 4 and extends down rearwardly from such cross piece in a curved direction with its free end resting on the brace 34 as illustrated. In this way the person of the attendant is effectively protected from accidentally being drawn into contact with the right hand kneading roller 9 at the rear or feeding side of the trough 1.

The remaining main features of the present invention is the provision of stripping or scraping bars. With these kneading machines it frequently happens, due to the ingredients used and due to the consistency of the plastic material before being properly kneaded, that the plastic material will cling to the kneading rollers 9 and thus interfere with the proper kneading action of such kneading rollers. Now it is well known that the plastic material due to its inherent cohesive quality ordinarily when clinging to the kneading rollers can be readily removed in layers or strips. The present invention takes advantage of this inherent characteristic. To this end, a stripping or scraping bar 29 will be disposed adjacent to the path of movement of the teeth 30 of each kneading roller 9. Such bar 29 consists of a scraping blade member 31 having an arm 32 continuing therefrom and secured at its end to a standard 3. The blade 31 as shown in Fig. 2 extends substantially in a plane radial to the shaft 8 and inclined toward the center of the trough 1 in a plane parallel to the path of movement of the teeth 30. Of course, the blade 31 will be located at the rear of the kneading roller 9, that is where the teeth leave the plastic material proper in the trough 1, so that the plastic material may be stripped or scraped out of the flutes between the teeth 30 and dropped back into the plastic material before being turned around with the kneading roller.

It is obvious that various changes and modifications may be made to the details of construction without departing from the general spirit of the invention as set forth in the appended claims.

We claim:

1. The combination with a kneading machine having a trough for carrying plastic material and mounted to rotate about a vertical axis, of a kneading roller operably mounted in said trough, an apron extending over part of said kneading roller, a shaft mounted on the lower end of said apron, and a roller rotatably mounted on said shaft and disposed adjacent to the plastic material to protect the attendant from being caught between the kneading roller and the plastic material.

2. The combination with a kneading machine having a trough for carrying plastic material and mounted to rotate about a vertical axis, of a kneading roller operably mounted in said trough, a support, an apron pivotally connected to said support and extending over part of said kneading roller, a shaft mounted on the lower end of said apron, and a roller rotatably mounted on said shaft and disposed adjacent to the plastic material to protect the attendant from being caught between the kneading roller and the plastic material.

3. The combination with a kneading machine having a trough for receiving plastic material and rotatably mounted about a vertical axis, of a kneading roller operably mounted in said trough, a support, and a guard extending from said support to terminate adjacent to said plastic material, said guard being positioned in front of said roller to protect the attendant from being caught between the roller and the trough.

4. The combination with a kneading machine having a trough for carrying plastic material, of a kneading roller operably mounted in said trough, and a guard extending over said kneading roller and terminating adjacent to said plastic material to protect the attendant from being caught by said roller.

5. The combination with a kneading machine having a trough for receiving plastic material, of a kneading roller operably mounted in said trough, a support, an apron pivotally connected to said support, and a roller rotatably secured to the lower end of said apron and resting on the plastic material to protect the attendant from being caught between the plastic material and the kneading roller.

6. The combination with a kneading machine having a trough for carrying plastic material, of a kneading roller operably mounted in said trough, standards adjacent to said trough, a cross bar connected to said standards and extending across said trough, and an apron secured to said cross bar and extending down over said kneading roller and into engagement with said plastic material to protect the attendant from being caught by the same.

7. The combination with a kneading machine having a trough for receiving plastic material, of a kneading roller operably mounted in said trough, standards adjacent to said trough, a cross bar connected to said standards and extending across said trough, a pivotal support extending across the kneading roller below said cross bar, a lower apron pivoted to said pivotal support and extending down into the trough and resting on the plastic material, and an upper apron pivoted to said cross bar and extending down over said kneading roller onto said lower apron, said aprons serving to protect the attendant from being caught by said roller.

8. The combination with a kneading machine having a trough for carrying plastic material, of a kneading roller operably mounted in said trough, standards adjacent to said trough, a cross bar connected to said standards and extending across said trough, a pivotal support extending from one of said standards and across said kneading roller below said cross bar, a lower apron pivoted to said pivotal support and extending down into the trough adjacent to said plastic material, a limiting stop on said pivotal support for determining the position of the lower apron when in guarding position, and an upper apron pivoted to said cross bar and extending down over said kneading roller onto said lower apron, said aprons serving to protect the attendant from being caught by said roller.

9. The combination with a kneading machine having a trough for carrying plastic material, of a kneading roller operably mounted in said trough, standards adjacent to said trough, a cross bar connected to said standards and extending across said trough, a pivotal support extending from one of said standards and across said kneading roller below said cross bar, a lower apron pivoted to said pivotal support and extending down into the trough, an upper apron pivoted to said cross bar and extending down over said kneading roller onto said lower apron, and a roller pivotally supported at the lower end of said lower apron to engage the plastic material to be kneaded, the aprons serving to protect the attendant from being caught by said roller.

10. The combination with a kneading machine having a trough, of a kneading roller operably mounted in said trough, standards adjacent to said trough, a cross bar connected to said standards and extending across said trough, a pivotal support extending from one of said standards and across said kneading roller below said cross bar, a lower apron pivoted to said pivotal support and extending down into the trough, an upper apron pivoted to said cross bar and extending down over said kneading roller onto said lower apron, and a latch for anchoring said upper apron in engagement with said lower apron, the aprons serving to protect the attendant from being caught by said roller.

11. The combination with a kneading machine having a trough for carrying plastic material, of a kneading roller operably mounted in said trough, a mixing device disposed in said trough, an adjusting wheel for said mixing device extending adjacent to said roller, and a guard extending over said kneading roller to said plaster material and between said adjusting wheel and said roller to protect the attendant from being caught by said kneading roller when manipulating said adjusting wheel, said guard also serving to protect the attendant from being caught by said roller when feeding material into said trough.

12. The combination with a kneading machine having a trough, of a fluted kneading roller operably mounted in said trough, a support, and a stripping blade fixedly secured to said support and extending across and adjacent to the fluted surface of said kneading roller to strip from the surface of said kneading roller any plastic material that may cling thereto as it leaves the trough.

13. The combination with a kneading machine having a trough rotatable about a vertical axis, of standards, fluted kneading rollers journaled in said standards to extend into said trough, and stripping blades fixedly secured adjacent to the fluted kneading surfaces of said rollers and supported by said standards, the stripping blades serving to strip from said rollers any plastice material that may cling to the surfaces thereof after leaving the trough.

NICHOLAS J. CAVAGNARO.
CONRAD AMBRETTE.